United States Patent
Koningen et al.

(10) Patent No.: US 7,399,454 B2
(45) Date of Patent: Jul. 15, 2008

(54) METALLURGICAL DUST RECLAMATION PROCESS

(75) Inventors: Darren Koningen, Don Mills (CA); William J. Freund, Silverthorne, CO (US)

(73) Assignee: Metalox International, LLC, Charleston, SC (US)

( * ) Notice: Subject to any disclaimer, the term of this patent is extended or adjusted under 35 U.S.C. 154(b) by 427 days.

(21) Appl. No.: 10/834,522

(22) Filed: Apr. 29, 2004

(65) Prior Publication Data
US 2005/0241439 A1  Nov. 3, 2005

(51) Int. Cl.
C22B 7/02 (2006.01)
C22B 3/20 (2006.01)

(52) U.S. Cl. .................. 423/150.3; 75/743; 75/961

(58) Field of Classification Search .............. 75/753, 75/746, 743, 961; 423/150.3
See application file for complete search history.

(56) References Cited

U.S. PATENT DOCUMENTS

| | | | |
|---|---|---|---|
| 2,643,204 A | 6/1953 | Mancke | |
| 2,762,703 A | 9/1956 | Mancke | |
| 2,785,991 A | 3/1957 | Benetch et al. | |
| 2,916,357 A * | 12/1959 | Schaufelberger | 423/141 |
| 3,849,121 A | 11/1974 | Burrows | |
| 3,888,748 A | 6/1975 | Brennecke | |
| 3,965,239 A | 6/1976 | Posel | |
| 3,966,462 A | 6/1976 | Posel et al. | |
| 4,008,152 A * | 2/1977 | Kleven | 209/444 |
| 4,038,361 A | 7/1977 | Posel | |
| 4,069,315 A | 1/1978 | Wagner et al. | |
| 4,071,357 A | 1/1978 | Peters | |
| 4,097,271 A | 6/1978 | Swinkels et al. | |
| 4,282,190 A | 8/1981 | Müller et al. | |
| 4,332,777 A | 6/1982 | Pazdej | |
| 4,414,196 A | 11/1983 | Matsumoto et al. | |
| 4,572,771 A | 2/1986 | Duyvesteyn et al. | |
| 4,610,721 A | 9/1986 | Duyvesteyn et al. | |
| 4,610,722 A | 9/1986 | Duyvesteyn et al. | |
| 4,614,543 A | 9/1986 | Duyvesteyn et al. | |
| 4,670,051 A | 6/1987 | Schneider | |

(Continued)

FOREIGN PATENT DOCUMENTS

CA   2156295   9/1994

(Continued)

OTHER PUBLICATIONS

The Metals Handbook, Desk Edtion, second Edition, ASM International, 1998, pp. 714-715.*

(Continued)

Primary Examiner—Roy King
Assistant Examiner—Tima M McGuthry-Banks (57) ABSTRACT

Improved methods for treating metallurgical compositions involve reacting a metallurgical composition with an aqueous nitric acid solution. The reaction is performed at a pressure of at least about 220 psig and at a temperature of at least 100° C. The metallurgical composition comprises iron and one or more non-ferrous metals. The reaction dissolves the majority of the non-ferrous metal compositions into the solution which is in contact with solid ferric oxide. The reaction can be repeated on the isolated solids to increase the purity of ferric oxide in the solids. Zinc can be removed from the mixed metal solutions obtained from furnace dust by a variety of separation techniques.

25 Claims, 5 Drawing Sheets

U.S. PATENT DOCUMENTS

| | | | |
|---|---|---|---|
| 4,834,793 | A | 5/1989 | Schneider et al. |
| 5,082,493 | A | 1/1992 | Barrett et al. |
| 5,185,141 | A | 2/1993 | Krockert et al. |
| 5,208,004 | A | 5/1993 | Myerson |
| 5,336,297 | A | 8/1994 | McElroy |
| 5,431,713 | A | 7/1995 | Myerson et al. |
| 5,441,712 | A | 8/1995 | Duyvesteyn et al. |
| 5,709,730 | A | 1/1998 | Cashman |
| 5,779,877 | A | 7/1998 | Drinkard, Jr. et al. |
| 5,837,216 | A | 11/1998 | Burow et al. |
| 5,897,685 | A | 4/1999 | Goozner et al. |
| 5,912,402 | A * | 6/1999 | Drinkard et al. .............. 75/743 |
| 5,980,842 | A | 11/1999 | Drinkard, Jr. et al. |
| 5,997,718 | A | 12/1999 | Goozner et al. |
| 6,086,846 | A | 7/2000 | Burow et al. |
| 6,179,908 | B1 | 1/2001 | Braun et al. |
| 6,264,909 | B1 | 7/2001 | Drinkard, Jr. |
| 6,280,649 | B1 | 8/2001 | Meisen |
| 6,302,952 | B1 | 10/2001 | Mobbs et al. |
| 6,338,748 | B1 | 1/2002 | Lee et al. |
| 6,395,242 | B1 | 5/2002 | Allen et al. |
| 6,406,676 | B1 | 6/2002 | Sundkvist |
| 6,451,088 | B1 | 9/2002 | Marsden et al. |
| 6,468,327 | B1 | 10/2002 | Siebenhofer et al. |
| 6,482,371 | B1 | 11/2002 | Rasmussen |
| 6,503,315 | B1 * | 1/2003 | Etzenbach et al. .......... 106/456 |
| 6,508,877 | B2 | 1/2003 | Meisen |
| 6,616,747 | B2 | 9/2003 | Sumita |
| 6,626,979 | B2 | 9/2003 | Marsden et al. |
| 6,666,903 | B1 | 12/2003 | Green |
| 6,689,206 | B2 | 2/2004 | Meisen |
| 6,755,891 | B2 | 6/2004 | Jones |
| 6,770,249 | B1 | 8/2004 | Hoboy et al. |
| 2002/0034465 | A1 | 3/2002 | Marsden et al. |
| 2002/0088374 | A1 | 7/2002 | Meisen |
| 2002/0117084 | A1 | 8/2002 | Hayashi et al. |
| 2002/0159927 | A1 | 10/2002 | Allen et al. |
| 2003/0066458 | A1 | 4/2003 | Emery et al. |
| 2003/0223942 | A1 | 12/2003 | Lister et al. |

FOREIGN PATENT DOCUMENTS

| | | | |
|---|---|---|---|
| DE | 216040 | A1 | 11/1984 |
| DE | 245438 | * | 12/1985 |
| DE | 284478 | A5 | 11/1990 |
| JP | 35-1224 | | 2/1960 |
| JP | 38-9852 | | 6/1963 |
| JP | 56-129615 | | 10/1981 |
| JP | 2001-200177 | | 7/2001 |
| WO | WO 97/16230 | A1 | 5/1997 |

OTHER PUBLICATIONS

Jha et al. "Review of hydrometallurgical recovery of zinc from industrial waste", Resouces Conservation & Recycling, 33 (2001) 1-22.*

English abstract of DD 245438.*

Perry's Chemcial Engineers' Handbook, seventh edition, McGraw-Hill, 1997, pp. 18-88 to 12-93 and 18-96 to 18-102.*

Goozner, Robert E. et al., "A Process to Recyle Thin Film PV Materials", 26th IEEE Photovoltaic Specialists Conference, Anaheim California, Sep. 29-Oct. 3, 1997.

"Processing Electric ARC Furnace Dust Into Saleable Chemical Produccts", OIT Steel Industry, Steel Project Fact Sheet, Nov. 2001.

"A Novel Method to Process Electric ARC Furnace (EAF) Dust Into Saleable Chemical Products", Pacific NW Pollution Prevention Resource Center Pollution Prevention Research Projects Databases, Dec. 1996.

Poliskin, J., "Pickling Acid Regeneration", Metal Finishing, Metal Industry Pub. Co., p. 72-74, Nov. 1965.

* cited by examiner

METALLURGICAL DUST RECLAMATION PROCESS

FIELD OF INVENTION

The present invention relates to a method for the recycling of metallurgical dust, such as Electric Arc Furnace dust (EAF dust) and dust from a Basic Oxygen Furnace (BOF dust), into chemicals that can more easily be handled. More particularly, the invention relates to use of acid to dissolve one or more metal compounds in metallurgical dust followed by selective recovery of the metals or other useful materials.

BACKGROUND OF THE INVENTION

Scrap metal can be recycled into quality steel using an electric arc furnace (EAF). In an EAF, the scrap metal is melted with electric arcs formed to the scrap metal. The scrap metal can include small amounts of non-ferrous metal and the like. The EAF process operates as a batch melting process, producing batches of molten steel. The EAF is a highly effective melting apparatus. A significant fraction of steel produced in the U.S. is produced with an electric arc furnace.

However, a drawback in the EAF manufacture of steel is the production of EAF metallurgical dust waste by-products. EAF dust is generated during the steel making process by a variety of mechanisms, including droplet ejection from the turbulent melt and vaporization. The vaporization mechanism is primarily responsible for the relatively high proportion of the non-ferrous metals in the dust such as zinc, lead, tin, chromium, copper and cadmium. The vaporized metals condense as oxides and ferrites and generally are collected downstream in a baghouse and/or electrostatic precipitator. Due to the presence of non-ferrous metals in the dust, the furnace dust cannot be directly recycled. The production of 1 ton of steel can generate approximately 34 pounds (15.4 kg) of waste EAF metallurgical dust.

The rapid growth of the EAF steel process has made EAF metallurgical dust one of the fastest growing and one of the most significant environmental problems worldwide. At present, there are approximately 600,000 metric tons of EAF waste generated annually in the USA and an additional 600,000 metric tons generated annually in the rest of the world. There are also similar quantities of metallurgical dust at a lower level of contamination that is derived from the other major process for steel manufacturing, the Basic Oxygen Furnace (BOF). Because the levels of toxic metals such as cadmium, lead and zinc are lower in BOF metallurgical dust, BOF dust is not currently classified by the EPA as hazardous. However, BOF metallurgical dust has non-iron contaminants that make it difficult to utilize it in current steel manufacture. Thus, BOF metallurgical dust may end up as unused waste.

EAF metallurgical dust may contain high concentrations of iron, zinc, and lead, and smaller amounts of tin, cadmium, chromium and copper. The remainder of the dust is other components, e.g., silica, lime and alumina. The nonferrous values represent potentially rich sources of metal values. Due to the presence of potentially hazardous metals, such as lead, chromium and cadmium, the EAF dust cannot be disposed in landfills since the hazardous metals may leach out due to rain or underground water to contaminate neighboring water sheds. Thus, the processing of the dust is an important commercial and environmental issue. Some specific examples of metal content for three samples of EAF dust are presented in Table 1.

TABLE 1

SAMPLE PLANT EAF DUST CONSTITUENTS FOR THREE DIFFERENT SAMPLES

| | % Zn | % Al | % Pb | % Fe | % Cd | % Cu | % Mn | % Na | % Ba |
|---|---|---|---|---|---|---|---|---|---|
| 1 | 20.3 | 0.27 | 1.27 | 36.0 | 0.02 | 0.16 | 3.54 | 0.59 | 0.01 |
| 2 | 22.7 | 0.30 | 1.04 | 34.8 | 0.01 | 0.13 | 3.60 | 0.70 | 0.01 |
| 3 | 27.0 | | 1.4 | 26.0 | 0.081 | | 3.4 | | |

| | % CaO | % Cr | % Mg | % Ni | % V | % As | % SiO2 | % Cl |
|---|---|---|---|---|---|---|---|---|
| 1 | 5.51 | 0.20 | 2.06 | 0.02 | 0.01 | .0036 | 2.52 | 0.96 |
| 2 | 5.48 | 0.20 | 2.48 | 0.13 | 0.02 | .0029 | 4.74 | 0.78 |
| 3 | | 0.25 | | | | | | |

SUMMARY OF THE INVENTION

The invention provides a method and an apparatus for converting hazardous metallurgical dust into manageable chemical products, such as non-toxic waste and/or marketable chemical products. Methods described herein can be based upon leaching of metallurgical dust at elevated pressure and temperature with nitric acid and the recovery of ferric oxide. The leaching step can be repeated to further purify the resulting ferric oxide solids. Also, one or more preliminary purification steps can be performed. Zinc can be removed from mixed metal solutions obtained from furnace dust by adding base to precipitate zinc hydroxide or by various other separation techniques.

In a first aspect, the invention pertains to a method of reacting a metallurgical composition with an aqueous nitric acid solution. The reaction is performed at a pressure of at least about 220 psig and at a temperature of at least 100° C. The metallurgical composition comprises iron and one or more non-ferrous metals. The reaction dissolves at least a portion of the non-ferrous metal compositions into the solution which is in contact with solid ferric oxide.

In another aspect, the invention pertains to a method for precipitating ferric oxide comprising subjecting an aqueous ferric nitrate solution to a temperature of at least about 100° C. at a pressure of at least about 220 psig.

In a further aspect, the invention pertains to an apparatus for treating metallurgical dust comprising a sealed pressure vessel at a pressure of at least about 220 psig holding a mixture of a metallurgical composition comprising at least iron and a solution of nitric acid.

DETAILED DESCRIPTION

As described herein, an improved process for the treatment of metallurgical dust involves the leaching of the metallurgical dust with nitric acid at elevated pressure conditions, and generally elevated temperature conditions, to dissolve one or more of the metal components of the dust while leaving a residue of ferric oxide. This process is built on the principle that at appropriate pressure and temperature conditions, iron forms solid iron oxide, specifically ferric oxide, in a nitric acid/nitrate solution. Since many of the other metal contaminants are solubilzed in nitric acid under the conditions at which ferric oxide is a precipitate, the ferric oxide can be separated from the other metal constituents. The high pressure leaching process can be repeated on the residue/precipitate from one pressurized leaching step to obtain a improved purity level of the ferric oxide. It has also been discovered that an initial low pressure leach can optionally be performed to initially process the dust to remove significant quantities of non-ferrous metals under pH conditions at which the iron remains in solid form. The high pressure leach approaches can be used to recover almost all of the iron from the original dust in very pure forms.

Metallurgic dust, as used herein, is any unpurified metal composition comprising a significant proportion of iron compositions. Suitable metallurgical dust includes, for example, metallurgical dust from steel manufacturing processes, such as EAF dust, as well as iron scrap, iron rouge recovered from steel cleaning lines, mill scale, iron containing minerals and low grade iron based pigments. Since it is impure, the metallurgical dust generally comprises at least about weight percent of non-ferrous metals prior to processing. In some embodiments, the metallurgical dust has an iron content from about 10 weight percent to about 70 weight percent and in further embodiments from about 20 to about 50 weight percent. A person of ordinary skill in the art will recognize that additional ranges of compositions within the explicit ranges are contemplated and are in the present disclosure.

In the improved processes herein, the formation of ferric oxide solids releases the corresponding nitric acid that at ambient pressure conditions would form a ferric nitrate solution. Better separation of the non-ferrous metals from the ferric oxide is accomplished with excess nitric acid present during the high pressure leach. In some embodiments, the excess nitric acid can be directly recovered for reuse without evaporating water since the nitric acid in the filtrate solution can be diverted back into the leaching process, possibly with the addition of more acid. Alternatively, the filtrate can be diverted to recover other metal constituents in the solution. The high pressure leach processes described herein can be used to obtain very high purities of ferric oxide in an efficient process with materials that can be readily handled.

A high proportion of the zinc in EAF metallurgical dust is present in the form of ferrites ($ZnO.Fe_2O_3$), which have proven resistant to leaching processes. Some leaching techniques have used a two-stage leach under ambient temperature and pressure in order to obtain reasonably pure precipitate products and a nitric acid regeneration process from nitrates, such as the processes described in U.S. Pat. Nos. 5,912,402 and 6,264,909, which are incorporated herein by reference. When performing the processing under atmospheric pressure, a basic composition is added to precipitate ferric hydroxide.

In contrast, as described herein, techniques for reclaiming metal values from metallurgical dust perform the reaction of the metallurgical dust with nitric acid under pressurized conditions, to form ferric oxide from a metal nitrate solution. A leaching process under pressure produces a purified ferric oxide precipitate with sufficient amounts of other metals removed such that the resulting material is not toxic waste. Generally, all of the materials throughout the processing are straightforward to handle.

The improved process described herein can comprise an initial water wash of the metallurgical dust, thereby removing some of the chloride compounds and perhaps other contaminants contained in the dust. An optional, preliminary leach of the dust with nitric acid can be performed under atmospheric conditions, generally prior to performing a pressurized leach. The preliminary nitric acid leach is performed at a pH at which the iron is insoluble but many of the non-ferrous metals are somewhat soluble. Removal of the filtrate produces a solid residue at a first purification level.

The process material for the pressurized leach are solids, which can be unprocessed metallurgical dust or solids obtained following one or more initial purification steps, such as water washing or acid leaching under atmospheric conditions. The process solid is reacted with nitric acid at enhanced pressure conditions, and generally enhanced temperature conditions. The acid can be added to the solids under pressurized conditions or at ambient conditions, although generally the pressure can be increased following the addition of the acid. Ferric oxide is formed in nitric acid under elevated pressure and temperature conditions. Thus, a significant amount of the iron in the solids can be collected as ferric oxide. On the other hand a significant proportion of the other metals are dissolved by the nitric acid into the solution at the elevated pressure conditions. Since many of the non-iron metals are dissolved, the recovered ferric oxide is significantly purified relative to the starting metallurgical waste. Thus, the processes described herein generally produce a ferric oxide solid product with contamination levels well below the present EPA toxic waste limits. Any $NO_x$ gas that is generated during this step can be collected and subsequently recycled into nitric acid. The pressurized leach step can be repeated one or more times to improve the purity of the ferric oxide. Specifically, by using the solid from one pressurized leach in a second pressurized leach, the remaining non-iron metal is dissolved into the solution during the subsequent processing step. In some embodiments, the ferric oxide that is generated can be sufficiently pure for a variety of uses including high value applications, such as in a pigment, in magnetic tape, in a polishing compound and in a variety of other uses.

Since the iron is not dissolved in the pressurized leach step once the pressure and temperature reach their target values, nitric acid is not consumed as ferric nitrate. Thus, less nitric acid is consumed in comparison with approaches that dissolve the iron in nitric acid and subsequently precipitate the iron from the solution by adjusting the pH. Generally, an excess of nitric acid is added in the pressurized leach steps. Thus, the filtrate from each acid leach may contain residual nitric acid. This residual nitric acid can be used by returning the filtrate, possibly with added nitric acid, to another acid leach step. Once a filtrate has excessive amounts of non-iron metals, the filtrate can be diverted to other processing steps to recover the other metals rather than to a leach step to use any excess acid. Also, different portions of the filtrate can be diverted to different uses, e.g., a portion can be recycled for its nitric acid content while another portion is diverted for recovery of non-ferrous metals.

The improved process for ferric oxide precipitation involves the use of a pressure vessel or autoclave that allows for reactions to occur at elevated temperatures and elevated pressures. Suitable pressure vessels for operating under appropriate high temperature and high pressure are available from various suppliers or can be constructed appropriately.

For example, titanium reactors with an appropriate pressure capabilities can be used. The size of the pressure vessel can be scaled, for example, to handle the desired quantity of metallurgical dust to treat at a given time. The pressure vessel can be piped for the transfer of materials into and out of the vessel, or materials within other containers can be transferred into and out from the pressure vessel manually. In some embodiments, the vessel can be piped for the transfer of $NO_x$ gases to a nitric recycle process. The particular vessel that contacts the solutions generally have an interior surface that is designed to withstand contact with concentrated acids, such as nitric acid. Interior surfaces that may be suitable for such a pressure vessel include titanium, ceramic, glass and the like. The vessel may or may not provide for agitation of the materials during processing.

In general, the metallurgical dust treatment can be performed in the vicinity of an EAF facility, a BOF facility or other dust generating facility, or the dust can be transported to a central recovery facility. If the reclamation process described herein is practiced near an individual dust producing locations, the transportation of hazardous waste and the potential liabilities associated with the shipment of hazardous and noxious wastes can be reduced or eliminated. In addition, the need for storage of such hazardous waste can be reduced and potentially eliminated.

Process

The improved method of treating metallurgical dust and recovering useful chemicals described herein is based on the differential solubilities of metal compounds in a nitric acid solution under elevated temperatures and pressure. In particular, insoluble ferric oxide forms at high pressures in an aqueous nitric acid/metal nitrate solution. For example, iron nitrate hydrolyzes and precipitates at elevated temperature and pressures. The reaction for the formation of ferric oxide is as follows:

$$2Fe(NO_3)_3 + 3H_2O \rightarrow Fe_2O_3 + 6HNO_3$$

In the present reaction, we do not need to consider whether or not iron nitrate is a formal intermediate in the process, but the end result of the processing is that ferric oxide is formed. Thus, the process comprises reacting the metallurgical dust or a partly purified form thereof with a solution of nitric acid under enhanced temperature and pressure, which can result in the complete or nearly complete dissolution of the non-iron metal compositions, such as zinc, manganese, cadmium and lead compositions, that are present in the metallurgical dust. Filtering of the solid results in the separation of the solid ferric oxide from the filtrate, which generally contains dissolved non-ferrous metals. Other metal values can then be recovered from the filtrate by further processing, and any unreacted nitric acid in the filtrate can be reused, if desired.

Figure 1:
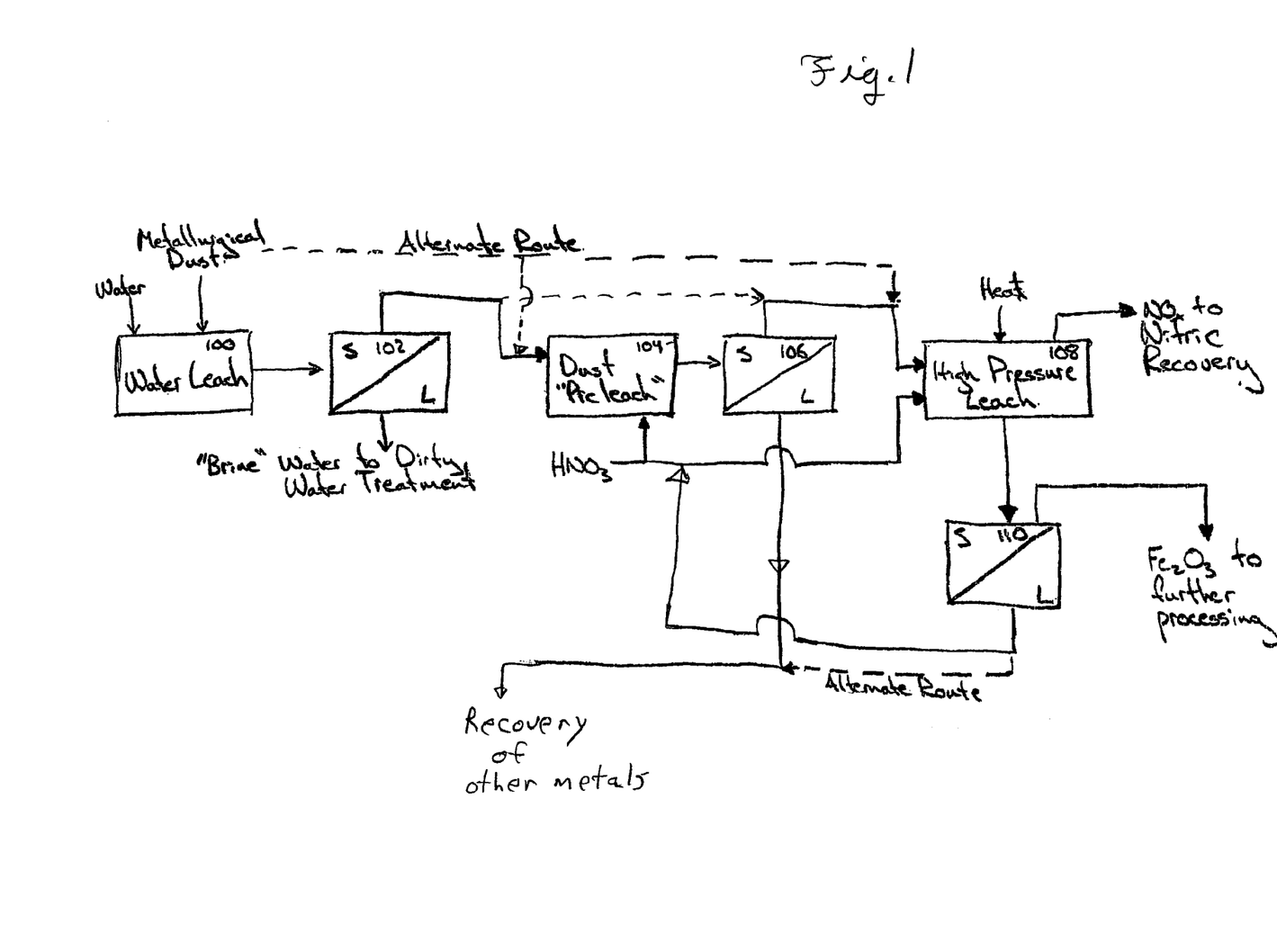
FIG. 1 is a flow chart of the process for treating a metallurgical composition, such as EAF dust, to produce a filtrate solution and a solid comprising ferric oxide.

The reclamation process is summarized in FIG. 1. The reclamation process can include an optional step of washing 100 the metallurgical dust with water. The washed dust is filtered 102 to separate the residual solid from the wash water. The process also optionally includes a preliminary leach or pre-leach 104 with nitric acid that is performed at ambient pressure. The pre-leach slurry is filtered 106 with the residue solids diverted for additional leaching and the filtrate liquid being diverted for further processing to recover non-ferrous metals. Additional preliminary treatments can also be performed, if desired. The residue from the one or more preliminary treatments is subjected to a pressurized nitric acid leach 108. The slurry from the nitric acid leach is filtered 110. The solids from the pressurized nitric acid leach are purified ferric oxide that are used in the purified form or optionally subjected to an additional pressurized leach to further purify the material, as described further below. The filtrates from the various leach steps can be diverted to reuse residual nitric acid or to further processing for the recovery of non-ferrous metal components. The further processing of the filtrates is described further below. Also, the residue solids can be subjected to one or more additional pressurized leach steps, as described further below. Each of the steps individually or groups of steps collectively can be performed in batch mode or alternatively in continuous operation.

In some embodiments, it can be beneficial to perform this initial step of washing 100 the metallurgical dust with water prior to the addition of nitric acid. In particular, the water wash can remove undesirable metal halides and other soluble compositions from the solids such that they are not present in later processing steps. In general, sufficient water can be added to the metallic waste to remove the desired compounds. Generally, mixture is stirred to facilitate the solubilization process. This wash can be performed in any reasonable vessel.

The water wash mixture can be subjected to solid-liquid separation 102 to separate a washed metallurgical dust residue from the filtrate solution. Separation process 102 can be performed by pressure filtration, vacuum filtration, gravity filtration as well as decanting the liquid from the solid, optionally after centrifugation. For filtration approaches, standard commercial filter media can be used, such as polymer woven cloth filter media, paper filter media, porous ceramic filter media, and the like. Regardless of the separation approach, for convenience the separated liquid is referred to as the filtrate, and the separated solids are referred to as the precipitate. The filtrate then can be sent to a water treatment system for processing. The residue solids can be further processed in an acid leach, which can be a pre-leach 104 or directly a pressurized acid leach 108.

Either washed or unwashed metallurgical dust can be optionally reacted, i.e., leached, 104 with a nitric acid solution at atmospheric pressure. Sufficient nitric acid generally is added to lower the pH to values in which significant quantities of non-ferrous metals are dissolved into the acid solution without dissolving a significant quantity of the iron compounds. The pH can be adjusted to be between about 0.25 and about 2.5, in other embodiments from about 0.35 to about 2.0, and in further embodiments from about 0.5 to about 1.5. The amount of iron that remains in the solid residue generally is at least about 95 weight percent, in further embodiments at least about 97 weight percent, and in additional embodiments at least about 99 weight percent. A person of ordinary skill in the art will recognize that additional ranges of pH and iron content are contemplated and are within the present disclosure.

In principle, one or more additional preprocessing steps can be performed to prepare the solid metal waste prior to performing the high pressure acid leach step. Similarly, the optional water leach and/or the pre-leach may or may not be performed. However, the selected solid is then subjected to a high pressure nitric acid leach step 108. Generally, the materials are also subjected to elevated temperatures during this step. During this step, a mixture is formed as a paste or slurry from the nitric acid solution and the metal dust waste. The water and/or acid may or may not be added at the high pressure and temperature conditions to achieve the desired results. Furthermore, a portion of the water and/or acid can be added at ambient pressure and an additional portion can be added at an elevated pressure. The order of performing this step may depend on the selected apparatus to perform the processing since it may be more or less difficult to add materials into the pressurized container. The mixture can be stirred to facilitate the solubilization of the non-ferrous metals.

The amount of nitric acid added is a function of the concentration of the acid and the volume of acid solution. While in principle pure nitric acid can be used, it can be difficult to handle and expensive to use undiluted nitric acid. In general, the metallurgical dust is reacted with a nitric acid solution having a concentration in the ranges from about a 10 weight percent to about a 75 weight percent nitric acid solution, in some embodiments, from about 20 weight percent to about 70 weight percent, and in further embodiments, from about 25 weight percent to about 65 weigh percent nitric acid solution. The nitric acid can be supplied from a nitric acid supply, which may comprise recycled nitric acid and/or a fresh supply of nitric acid. With respect to relative quantities on compositions, relative weights of nitric acid and metal waste generally depends on the concentration of the nitric acid solution. Also, if a more concentrated nitric acid solution is added to form the pulp, additional water may also be added. For more dilute nitric acid solutions, a weight ratio of nitric acid to the metallurgical dust may be, for example, a ratio of about three-to-1 (3:1) or greater by weight acid solution to dry metallurgical dust. In other embodiments with a higher acid concentration, a weight ratio may be used of one-to-one (1:1) or less of acid solution to dry metallurgical dust. In general, the desired amount of acid added may also depend on the composition of the metal dust. The amount of acid can be evaluated by examining the acid in the resulting mixture. The concentration of acid in the resulting mixture can be selected to yield the desired solubilization of the non-ferrous metals into the filtrate solution. Acceptable leaching can be accomplished with no free acid in the mixture. However, generally higher purity ferric oxide is obtained when the mixture contains free nitric acid. The concentration of free nitric acid can be at least 5 grams/liter (g/L), and in some embodiments at least about 15 g/L, in further embodiments at least about 30 g/L and in additional embodiments at least about 50 g/L. Although the free acid can be measured at various times in the solubilization process at elevated pressures, these values can be considered the equilibrium values after a sufficient period of time that the concentration no longer changes significantly. A person of ordinary skill in the art will recognize that additional ranges of reactant acid concentrations, weight ratios of acid to solid quantities and free acid concentration within the explicit ratios above are contemplated and are within the present disclosure.

The amount of acid added can involve trade offs with respect to cost and results. The addition of more acid increases the cost for the acid, but the addition of more acid can result in better solubilization of the non-iron metals. Better solubilization of the non-iron metals results in a more pure ferric oxide product. In particular, to obtain the more complete dissolving of lead and zinc, the presence of free nitric acid may be desirable during and following the nitric acid leach 108. If lower amounts of nitric acid are used, undissolved ferrites may remain in the solids. However, multiple nitric acid leaches may be performed to dissolve the non-iron metals, whether or not in the form of ferrites, and to recover purer precipitates of ferric oxide.

The high pressure nitric acid leach process can involve one or more steps within the process. For example, to perform the high pressure leach, the metallurgical dust and the nitric acid can be combined at ambient temperature and pressure to form a slurry or pulp. The mixture can be performed in a pressure vessel, or the mixture can be formed in another vessel and subsequently transferred to the pressure vessel for performing the high pressure leach. In some embodiments, the metallurgical dust and nitric acid can be combined at elevated temperature and/or pressure, for example the temperature and pressure used to precipitate the ferric oxide.

In a particular embodiment, the nitric acid and metal dust generally is mixed initially at ambient pressures. This mixing may or may not take place within the pressure vessel. If the mixing is initially performed outside of the pressure vessel, the mixture is transported into the pressure vessel. The pressure can be increased by closing the pressure vessel and increasing the temperature. Steam can be injected to effectuate the increase in both the temperature and the pressure. Alternatively or additionally, the reactor can be heated with a heating mantle or the like and/or the slurry can be heated during the transfer into the reactor vessel.

Upon forming the combination of dust and acid, the mixture can be mixed at ambient pressure in some embodiments for at least about one quarter hour and in further embodiments from about half an hour to about five hours and in further embodiments from about one hour to about two hours. Also, the reaction time under elevated pressure should be selected to achieve the desired solubilization of the non-ferrous metals into the nitric acid solution. In general, after a sufficient period of time, the mixture reaches equilibrium such that the composition does not change significantly with the passage of additional time. In the examples below, the composition generally stopped changing after about 2 to about 2 ½ hours. Generally, the leach within the selected pressure and temperature ranges is performed for at least about 30 minutes, in additional embodiments for at least about one hour, in further embodiments for at least about two hours, and in other embodiments from about 2 ½ hours to about 5 hours. A person of ordinary skill in the art will recognize that additional reaction times within the explicit ranges of reaction time are contemplated and are within the present disclosure. Mechanical impellers or other mixing apparatuses can be used to mix the slurry.

In addition, the elevated temperatures and pressures used during the high pressure nitric acid leach 108 step increase the dissolution of the zinc, lead and other non-ferrous metals. The pressure and temperature may also influence the rates of dissolution. Over appropriate ranges of the elevated temperatures and pressures of the nitric acid solution in the pressure vessel, ferric oxide is almost completely insoluble such that almost all of the iron is recovered as ferric oxide. Thus, the ferric oxide can be separated from the non-iron metals that remain in solution. Impurities can result, for example, from solid ferrites that maintain non-iron metals within the solids. In some embodiments, the high pressure leach reaction generally takes place at temperatures in the range of at least about 150° C., in further embodiments from about 200° C. to about 500° C., in other embodiments from about 225° C. to about 400° C., and in further embodiments from about 250° C. to about 350° C. In addition, the pressure of the pressure vessel generally can be maintained at a value of at least about 225 psig, in further embodiments from about 250 psig to about 800 psig, in other embodiments from about 275 to about 600 psig, and in some embodiments from about 300 psig to about 500psig. The psig (pounds per square inch gauge) is a measure of pressure such that the stated value is the amount above atmospheric pressure. For batch processing, the above values may be average values potentially following a transient period in which the temperature and pressure ramp up to near the average processing conditions. A person of ordinary skill in the art will recognize that additional ranges of temperature and pressure within the explicit ranges are contemplated and are within the present disclosure.

The high pressure nitric acid leach step 108 can generate gas, $NO_x$, which can be vented for transportation to a location for collection and recovery of nitric by combining the gas with water. The venting of any nitric oxide gases should be performed with due regard for maintaining the pressure in the pressure vessel at desired levels. Similarly, the collected nitric oxide gases can be isolated from the pressure vessel for recovery, for example using conventional pressure valves. The nitric gases represented by $NO_x$ can be converted into nitric acid for reuse, for example, following to procedure described in U.S. Pat. No. 6,264,909 to Drinkard, Jr., entitled "Nitric Acid Production And Recycle," incorporated herein by reference.

The residual solid comprising mostly ferric oxide is separated 110 from the filtrate. In addition, the residual solid can be washed to remove solubilized non-ferrous metals that stick to the solids during the separation step. In general, the washing can be performed in any reasonable approach. In one embodiment, one or more washing steps are used in which each washing step involved suspending the solids in water and filtering the solids. Enough water can be used to perform the suspension in each step. The wash steps can be repeated until the wash water has a desired level of purity. The wash water can be added to the initial filtrate, separately processed to remove the metal components or otherwise treated for disposal.

The filtrate from the high pressure leach generally has free nitric acid as well as significant quantities of solubilized non-ferrous metals. This solution can be alternatively returned to perform additional leach steps at ambient pressure or at elevated pressures to make use of the free nitric acid. Additional nitric acid can be added from a nitric acid supply to obtain the desired levels of acid for the leach. Additionally or alternatively, a portion or all of the filtrate can be directed to further processing to reclaim the non-ferrous metals from the solution, as described further below. FIG. 1 shows some alternative processing pathways for the filtrate solution.

Figure 2:
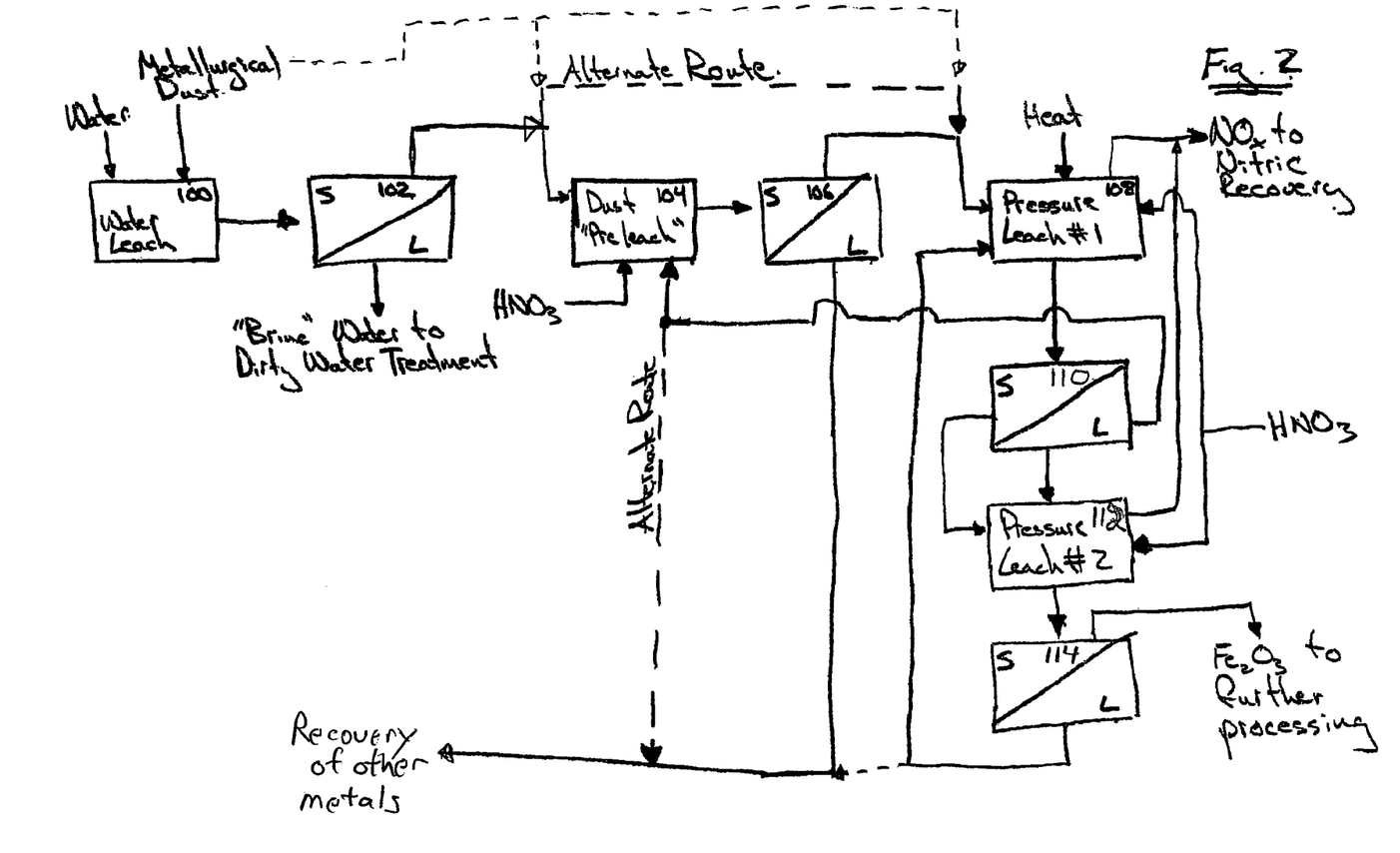
FIG. 2 is an expanded flow chart of FIG. 1, which adds a second leaching step to the process of obtaining ferric oxide.

FIG. 2 expands upon the improved reclamation process shown in FIG. 1 by showing the addition of another pressurized nitric acid leaching step 112, in which the ferric oxide solids from the first pressurized nitric acid leaching step are contacted with additional nitric acid and subjected to elevated pressures, generally with the addition of heat. In the additional leaching step 112, nitric acid can be added to the ferric oxide precipitate either under elevated pressure or added at ambient pressure and subsequently reacted under pressure. The additional nitric acid leaching step 112 generally is conducted similarly to the initial nitric acid leaching step 108 described above. Generally, pressurized nitric acid leach is conducted with free nitric acid present. The free nitric acid levels can be comparable to those levels described above for leaching step 108. Since the products have already been purified, lower amounts of acid may be needed for pressurized leach 112. Additional ferrites may be dissolved in this second leach, resulting in a purer ferric oxide product. Any $NO_x$ gases produced at this stage can be recycled according to the nitric acid recovery.

After sufficient time has passed, the materials from the second pressurized leach are subjected to filtration 114. The solids can also be washed with various amounts of water, as described above with respect to filtration step 110. The solids/precipitate from the filtration are purified ferric oxide. The filtrate from this second leach may or may not be combined with the filtrate from an earlier leach step, and the individual or combined filtrates can be reused, optionally with the addition of further nitric acid, in another leach step or further processed for recovery of non-ferrous metals. Portions of the filtrate can be processed differently, as desired. One or more additional pressurized leach steps can also be performed to further increase the purity of the ferric oxide solid product.

Using one, two or more pressurized leach steps, the resulting ferric oxide can have many metal contaminant levels reduced to values as low as desired. With two pressurized processing steps, it is possible to obtain ferric oxide without most of the non-ferrous metals. Chromium evidently is very difficult to separate from the ferric oxide and coprecipitates with the ferric oxide. But the other heavy metals generally are removed in the pressurized nitric acid leach to purify the ferric oxide. Pure ferric oxide ($Fe_2O_3$) has 69.94 weight percent iron and 30.06 weight percent oxygen.

The differential solubilities are sufficient that at least about 95 percent, in some embodiments at least about 97.5% and in further embodiments at least about 99% of the initial iron in the metallurgical waste fed into the pressurized nitric acid leach can be recovered as purified ferric oxide. In general, it is possible to obtain a solid product with at least about 70 weight percent, in further embodiments at least about 80 weight percent ferric oxide and in other embodiments from about 85 to about 100 weight percent ferric oxide. In some purified ferric oxide materials, a majority of the remaining impurities comprise silicates. At the same time, it is possible to reduce zinc levels to very low values, such as levels of no more than about 5% of the initial zinc. Specifically, zinc metal concentrations in the ferric oxide solids can be reduced to values no more than about 10 weight percent, in further embodiments no more than about 2 weight percent, in other embodiments no more than about 0.5 weight percent and in additional embodiments no more than about 0.1 weight percent. A person of ordinary skill in the art will recognize that additional ranges of compositions within the explicit ranges are contemplated and are within the present disclosure.

Similarly, lead, cadmium and manganese can be reduced to low concentrations. In particular, toxic lead levels can be reduced to no more than about 0.1 weight percent, in other embodiments no more than about 0.05 weight percent and in further embodiments no more than about 0.04 weight percent. Other metal levels, such as arsenic, cadmium, manganese, can be similarly reduced. A person of ordinary skill in the art will recognize that additional ranges of concentrations are contemplated and are within the present disclosure. Since the heavy metal concentrations can be reduced significantly in the purified ferric oxide solids, there are many options for handling the solid product, including disposing of the solid as regular waste, directing the product back into the steel making operation or using the product in higher value uses, such as for pigments. For use as pigments, the purified ferric oxide can be incorporated, for example, into a coating composition by combining the ferric oxide with a suitable carrier liquid. Alternatively or additionally, the purified ferric oxide can be combined with a molding composition for molding into a solid object incorporating the ferric oxide as a pigment. The molding composition can comprise, for example, a polymer or concrete. The forming of the solid object can be based on any of a variety of approaches including, for example, any of various molding approaches, extrusion approaches, and the like.

A significant result of the process is that the product dust may no longer be classified as toxic waste under current standards of the Environmental Protection Agency (EPA) under the Toxicity Characteristic Leach Procedure based Toxicity Characteristic metal waste limits for land fills as found presently in the Code of Federal Regulations, 40 C.F.R. § 261.24 (Toxicity Characteristics), incorporated herein by reference. In particular, it has been demonstrated that sufficient amounts of heavy metals can be removed with a single pressurized nitric acid leach, as described herein, that the resulting solids are no longer toxic waste under 2004 EPA solid waste standards, incorporated herein by reference. Specifically, sufficient amounts of arsenic, barium, chromium, mercury, nickel and lead are removed. The ability to treat the dust to form a solid that is not hazardous waste is an important result of the process. Of course, with appropriate processing, the processes described herein can further improve the purity of the resulting ferric oxide not only to have a material that is not hazardous waste, but that is suitable for desired uses such as pigments. In particular, crystalline ferric oxide can be produced from the processes described herein that have desirable characteristics for a variety of uses, such as pigments, which further benefit from the crystallinity of the purified ferric oxide. Substantial crystallinity can be varified using x-ray diffraction analysis of the product materials.

The filtrate following removal of ferric oxide comprises nitric acid and dissolved non-ferrous metal compounds. Generally, a significant fra remaining metals can be recovered to produce useful materials.

Additional metals can be reclaimed from the metal nitrate filtrate solution. The solution can be evaporated to dryness and decomposed to produce metal oxides, oxygen and nitrogen oxide gases ($NO_x$), which can be recovered and added to water to form nitric acid. The metal oxides can be further processed to recover desired metals. Approaches for the recovery of nonferrous metals is described further in U.S. Pat. No. 5,912,402 to Drinkard, Jr., et al., entitled "Metallurgical Dust Recycle Process," incorporated herein by reference.

Apparatus

Generally, the various steps of the metal recovery process can be performed with commercially available reactors and vessels. The pressurized nitric acid leach steps combine various reactants and equipment to accomplish the ferric oxide purification. An embodiment of an apparatus for performing the pressurized nitric acid leach for treating metallurgical dust can comprise metallurgical dust and aqueous nitric acid in a sealed reaction vessel capable of withstanding the pressures reached during the process. The vessels used for at some of the other steps of the reclamation process do not necessarily have to be pressure vessels.

The metallurgical dust can be supplied from an Electric Arc Furnace (EAF), a Basic Oxygen Furnace (BOF) or some other process that produces waste metallurgical dust. The water used in the apparatus to wash the metallurgical dust can be city water, deionized water, some other processed water or a combination thereof.

Figure 3:
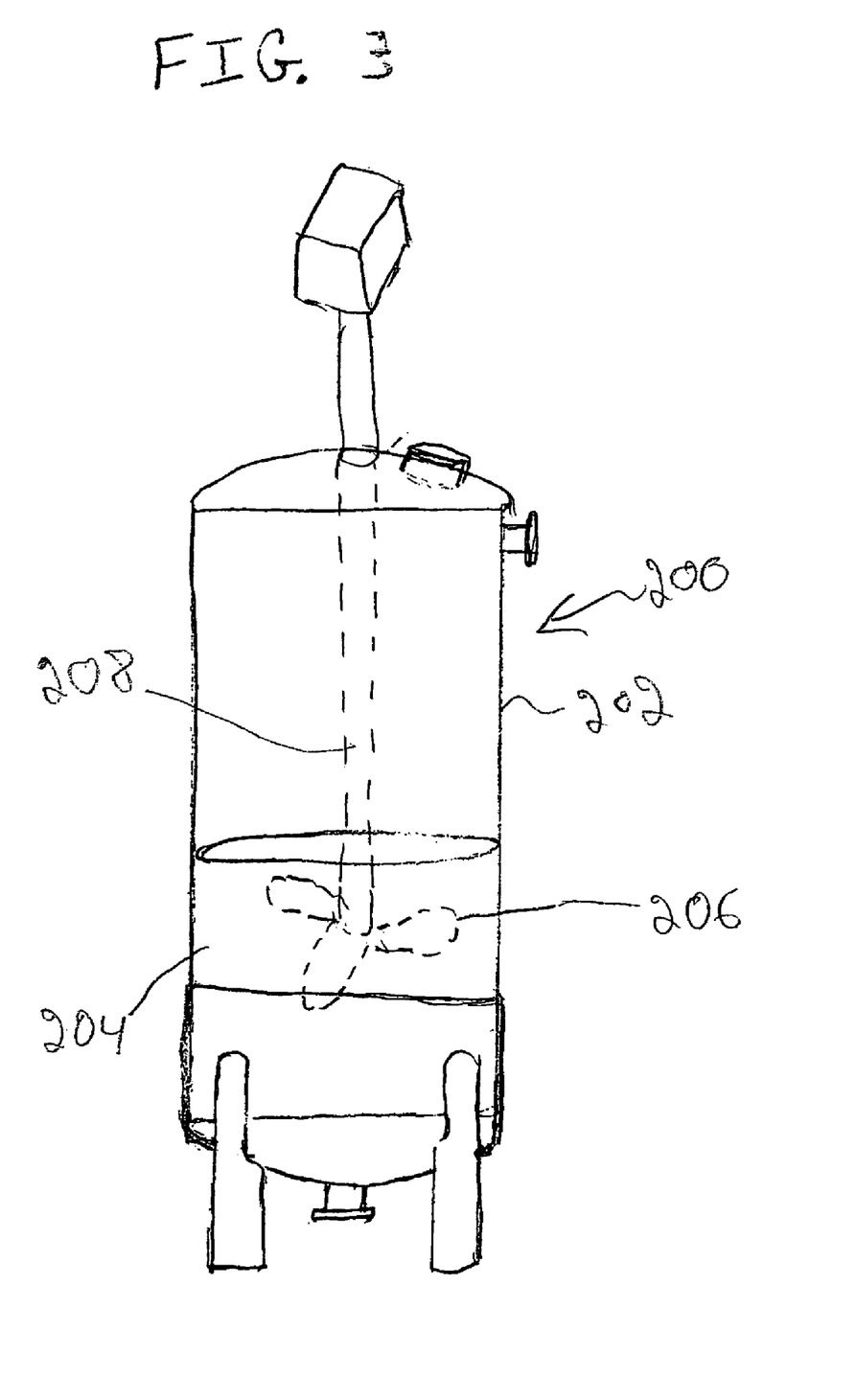
FIG. 3 is schematic diagram depicting an apparatus to conduct a nitric acid leach of a metallurgical composition under pressure.

Referring to FIG. 3, a schematic diagram shows a reactor suitable for performing the pressurized nitric acid leach. Reaction system 200 comprises a pressure vessel/reactor 202, a paste or pulp 204 of the aqueous nitric acid and metallurgical dust, a heating element 206, and an impeller 208 for stirring the reaction mixture/pulp. Suitable reaction systems can be adapted from commercial reactors or can be constructed from readily available materials. For example, suitable lab scale reactors include, for example, pressure reactors available from Parr Instrument Co., Moline, Ill.

The nitric acid solution can be provided from a nitric acid supply, which can be provided from commercial sources, the nitric acid recycle system which recovers nitrogen oxide gases that are hydrated to form nitric acid, filtrate solutions from a leach step that has free nitric acid, or a combination thereof.

EXAMPLES

The metallurgical dust used in the following tests was produced as the result of a steel making operation and was EAF dust. The EAF dust that was provided for the various tests had already been washed with water. Hence, washed metallurgical dust was used in all of the tests.

Examples 1

Metallurgical Dust Pressure Nitric Acid Leach Tests

These examples demonstrates the feasibility of precipitating ferric oxide and solubilizing other metals from a slurry of metallurgical dust and nitric acid. The processing is performed in a pressurized vessel with the application of heat with conditions selected to obtain good separation of ferric oxide solids. The leach temperatures and free acid levels in the tests were varied in order explore the results under different conditions. These tests utilized EAF dust samples with the following components, as determined by an elemental analysis.

TABLE 1

| Component | Wt. Percent (%) |
|---|---|
| Iron | 26.0 |
| Zinc | 27.0 |
| Lead | 1.4 |
| Cadmium | 0.081 |
| Manganese | 3.4 |
| Chrome | 0.25 |

A quantity (240 g.) of EAF dust was pulped with 400 mL of deionized water and mixed with a mechanical mixer in a reactor vessel. The reactor vessel was a Parr pressure reactor (Parr Instrument Co., Moline, Ill.) with stirring. While mixing, 69% nitric acid was slowly added (over a period of 30 minutes) to the mixture. The acid was added to produce an overall acid addition ratio of 1175 g of 69% acid per kg of dry dust. The slurry was allowed to mix for 60 minutes from the time of the last acid addition. At the end of the mix time, a 25 mL pulp sample was removed from the vessel and filtered. The sample solution (filtrate) was collected and submitted for analysis. The sample filter cake residue was washed with deionized water, dried, and weighed. A portion of the filter cake was analyzed for composition.

An additional amount of 69% nitric acid was added to the pre-mixed dust slurry prior to introducing the slurry into the reactor vessel. The material in the reactor vessel was mixed for an additional 30 minutes, and then the autoclave vessel was sealed.

The material in the autoclave vessel was heated to 180-220° C. for 3 hours, via external vessel heating. The pressure in the vessel was monitored such that the vessel was vented if the pressure approached 500 psig. Kinetic samples, i.e., intermediate samples, of the autoclave material were taken at 1 hour and at 2 hours from the time the material reached temperature. The kinetic pulp samples were filtered, and the pressure leach solution samples (filtrate) were collected and analyzed. The filter cake residue samples were washed with deionized water, dried, weighed, and analyzed.

At the end of 3 hours, the autoclave was cooled and the pressure was relieved. The filtrate was collected and analyzed. The filter cake residue was displacement washed 3 times with fresh water. The wash solutions were combined and analyzed. The washed filter cake residue was dried, weighed and analyzed.

The initial mix (at atmospheric pressure) and the pressure acid leach conditions are summarized below:

| Initial Mix | | Added To Initial Mix ForPressure Acid Leach | |
|---|---|---|---|
| Feed weight (g) | 240 | Deionized water (g) | 200 |
| Deionized water (g) | 400 | 69% nitric acid (g) | varied |
| 69% nitric acid (g) | 282 | Pulp density (% solids w/w) | 15-20 |
| Time (min.) | 60 | Temperature (° C.) | 180-220 |
| Pulp Density (% solids w/w) | 26.0 | Time (at temperature) (min.) | 180 |

Table 2 provides the key operating conditions for the autoclave leach tests. By the time that the reactor was up to temperature, the pressure in the reactor generally ranged between 360 psig and 500 psig when the reactor was at about 220° C. and greater than 100 psig when the leaching was performed at 180° C. Table 3 provides results of analysis of the samples taken during and at the completion of the leaching process.

Table 2

TABLE 2

| Test No | Pre Mix | | | PAL | | | | |
|---|---|---|---|---|---|---|---|---|
| | 69% Nitric (kg/t feed) | Pulp Density % solids | Leach Time (h) | 69% Nitric (kg/t feed) | Pulp Density % solids | Temp ° C. | Oxygen over psi | Leach Time (h) |
| PAL 1 | 1175 | 26 | 1 | 467 | 19.4 | 220 | 0 | 3 |
| PAL 2 | 1175 | 26 | 1 | 467 | 19.4 | 180 | 0 | 3 |
| PAL 4 | 1175 | 26 | 1 | 700 | 18.6 | 220 | 0 | 3 |
| PAL 3 | 1175 | 26 | 1 | 933 | 17.8 | 220 | 0 | 3 |
| PAL 6 | 1175 | 26 | 1 | 933 | 17.8 | 220 | 50 | 3 |
| PAL 5 | 1175 | 26 | 1 | 1050 | 17.5 | 220 | 0 | 3 |
| PAL 7 | 1175 | 26 | 1 | 1050 | 17.5 | 220 | 0 | 3 |

Note:
PAL 7 is a repeat of PAL 5 with a finer grind

TABLE 3

| Test No | Retention Time (h) | Filtrate Assays (g/L) | | | | | | Free Acid (g/L) | Assays (%) | | |
|---|---|---|---|---|---|---|---|---|---|---|---|
| | | Cd | Cr | Fe | Mn | Pb | Zn | | Cd | Cr | Fe |
| PAL 1 | Premix | | | | | | | 4 | 0.0130 | 0.37 | 45 |
| | 1 | 220 | 8.7 | 440 | 7600 | 3500 | 57700 | 17 | 0.0030 | 0.50 | 58 |
| | 2 | 220 | 1.6 | 86 | 8300 | 3500 | 61000 | 13 | 0.0021 | 0.40 | 50 |
| | 3 | 240 | 3.3 | 230 | 8500 | 3600 | 63100 | 13 | 0.0023 | 0.6 | 58 |
| PAL 4 | 1 | 220 | 46 | 1100 | 8400 | 3800 | 69000 | 44 | 0.0016 | 0.41 | 45 |
| | 2 | 210 | 6.9 | 260 | 8500 | 3500 | 68000 | 36 | 0.0005 | 0.48 | 56 |
| | 3 | 220 | 6.4 | 500 | 9100 | 3700 | 72000 | 40 | 0.0005 | 0.58 | 57 |
| PAL 3 | 1 | 200 | 47 | 1900 | 7900 | 3300 | 64000 | 62 | 0.0022 | 0.44 | 50 |
| | 2 | 210 | 24 | 700 | 8000 | 3300 | 62000 | 62 | 0.0020 | 0.47 | 53 |
| | 3 | 220 | 33 | 1800 | 8600 | 3500 | 67000 | 63 | 0.0025 | 0.56 | 56 |
| PAL 6 | 1 | 217 | 70 | 2690 | 8770 | 3470 | 71000 | 100 | 0.0001 | 0.35 | 53 |
| | 2 | 228 | 44 | 1540 | 9420 | 3660 | 75300 | 105 | 0.0001 | 0.45 | 55 |
| | 3 | 210 | 85 | 3930 | 8460 | 3310 | 67900 | 91 | 0.0001 | 0.44 | 54 |
| PAL 5 | 2 | 220 | 91 | 1560 | 9020 | 3500 | 73700 | 80 | 0.002 | 0.37 | 52 |
| | 2.5 | 221 | 57 | 640 | 8950 | 3500 | 72500 | 77 | 0.002 | 0.37 | 54 |
| | 3 | 221 | 72 | 1840 | 8760 | 3460 | 71600 | 77 | 0.002 | 0.49 | 48 |
| PAL 2 | Premix | 330 | 210 | 10000 | 2900 | 5700 | 84000 | — | 0.0120 | 0.37 | 41 |
| | 1 | 200 | 250 | 4700 | 4200 | 3500 | 55000 | 55 | 0.0067 | 0.28 | 43 |
| | 2 | 220 | 290 | 2900 | 5900 | 4000 | 64000 | 43 | 0.0054 | 0.29 | 47 |
| | 3 | 230 | 290 | 2400 | 8000 | 3900 | 69000 | 23 | 0.0046 | 0.32 | 51 |
| PAL 7 | Premix | — | — | — | — | — | — | — | 0.013 | 0.36 | 41 |
| | 1 | 200 | 87 | 1700 | 8000 | 3100 | 64000 | 75 | 0.0018 | 0.47 | 54 |

TABLE 3-continued

Test Results

| | | | | | | | | | | |
|---|---|---|---|---|---|---|---|---|---|---|
| 2 | 190 | 76 | 1200 | 7700 | 3000 | 61000 | 70 | 0.0005 | 0.5 | 58 |
| 3 | 170 | 60 | 880 | 7400 | 3000 | 64000 | 80 | 0.0005 | 0.55 | 59 |

| Test | Assays (%) | | | Dissolution (%) | | | | | |
|---|---|---|---|---|---|---|---|---|---|
| No | Mn | Pb | Zn | Cd | Cr | Fe | Mn | Pb | Zn |
| PAL 1 | 5.60 | 0.1 | 14.0 | | | | | | |
| | 0.99 | 0.0 | 3.7 | 98.5 | 1.5 | 0.7 | 87.3 | 98.6 | 93.3 |
| | 0.54 | 0.0 | 2.5 | 99.0 | 0.4 | 0.2 | 93.3 | 98.9 | 95.7 |
| | 0.61 | 0.0 | 2.6 | 98.9 | 0.5 | 0.3 | 92.3 | 98.7 | 95.4 |
| PAL 4 | 0.26 | 0.036 | 0.83 | 99.1 | 8.0 | 1.9 | 96.1 | 98.8 | 98.5 |
| | 0.10 | 0.027 | 0.16 | 99.8 | 1.4 | 0.4 | 98.8 | 99.2 | 99.8 |
| | 0.06 | 0.032 | 0.20 | 99.7 | 1.1 | 0.8 | 99.3 | 99.0 | 99.7 |
| PAL 3 | 0.23 | 0.05 | 0.98 | 98.8 | 8.6 | 3.2 | 96.8 | 98.4 | 98.3 |
| | 0.12 | 0.05 | 0.70 | 99.0 | 4.6 | 1.2 | 98.4 | 98.4 | 98.8 |
| | 0.14 | 0.06 | 0.84 | 98.8 | 5.5 | 3.0 | 98.3 | 98.3 | 98.7 |
| PAL 6 | 0.14 | 0.029 | 0.42 | 99.5 | 15.9 | 4.6 | 98.3 | 99.1 | 99.4 |
| | 0.08 | 0.013 | 0.06 | 99.5 | 7.8 | 2.4 | 99.0 | 99.1 | 99.9 |
| | 0.09 | 0.020 | 0.11 | 99.5 | 16.9 | 15.2 | 99.0 | 99.1 | 99.8 |
| PAL 5 | 0.11 | 0.030 | 0.43 | 99.2 | 21.3 | 3.2 | 98.9 | 98.4 | 99.5 |
| | 0.03 | 0.013 | 0.06 | 99.2 | 17.3 | 3.5 | 99.7 | 98.4 | 99.9 |
| | 0.11 | 0.050 | 0.67 | 99.9 | 12.2 | 3.5 | 98.7 | 98.2 | 99.0 |
| PAL 2 | 5.10 | 0.085 | 13.0 | 93.7 | 23.3 | 11.6 | 23.4 | 97.3 | 77.6 |
| | 3.60 | 0.053 | 11.0 | 96.1 | 42.2 | 8.2 | 48.8 | 98.2 | 80.3 |
| | 2.90 | 0.040 | 9.4 | 96.8 | 42.6 | 4.4 | 60.2 | 98.7 | 83.5 |
| | 1.40 | 0.045 | 5.9 | 97.5 | 41.1 | 3.6 | 81.3 | 98.5 | 90.0 |
| PAL 7 | 5.2 | 0.078 | 14 | 93.1 | 24.0 | 11.7 | 20.2 | 97.0 | 74.7 |
| | 0.077 | 0.024 | 0.22 | 99.2 | 16.8 | 3.3 | 99.1 | 99.3 | 99.7 |
| | 0.023 | 0.021 | 0.034 | 99.8 | 15.0 | 2.3 | 99.7 | 99.4 | 100.0 |
| | 0.024 | 0.021 | 0.04 | 99.8 | 11.7 | 1.8 | 99.7 | 99.4 | 100.0 |

Summary of Results For PAL1-PAL7

It appears that, generally, the increased temperature and increased free acid levels result in more complete dissolution of the EAF dust ferrite content and, consequently, lower residue solids impurity levels.

Table 4 summarizes the TCLP (Toxicity Characteristic Leaching Procedure) results for Samples PAL1 and PAL 4, and also contains the EPA limits for delisting a material produced from a hazardous waste.

TABLE 4

| | As (mg/L) | Ba (mg/L) | Cr (mg/L) | Hg (mg/L) | Ni (mg/L) | Pb (mg/L) |
|---|---|---|---|---|---|---|
| EPA limit (delisting) | 0.5 | 7.6 | 0.33 | 0.001 | 1.0 | 0.15 |
| PAL 1 | <0.05 | 0.10 | 0.10 | <0.001 | <0.02 | 0.02 |
| PAL 4 | <0.05 | 0.17 | <0.02 | <0.001 | 0.04 | 0.10 |

These results demonstrate that the extraction of the non-ferrous metals except for chromium was very high, and generally reached levels of 99+. The final iron product generally included the chrome content of the initial dust. However, the use of higher acid levels generally resulted in greater removal of the non-ferrous metals, and a corresponding lower impurity level. An iron content approaching 60% indicates that the iron was present in the form of crystalline hematite with a quantity of (10-15 weight %) dust insolubles (silicates). The recovery of iron was greater than 95 weight percent. The levels of zinc, manganese and lead decreased with increasing amounts of free acid. The extraction of the non-ferrous metals into the solution generally seemed complete after about 2 to 2.5 hours.

Example 2

Pressurized Leach Results With Second Experimental Setup

These examples demonstrates the feasibility of precipitating ferric oxide and solubilizing other metals from a slurry of metallurgical dust and nitric acid. The processing is performed in a pressurized vessel with the application of heat with conditions selected to obtain good separation of ferric oxide solids. The leach temperatures and free acid levels in the tests were varied in order explore the results under different conditions. These test were performed similarly to those in Example 1 using an alternative test setup. These tests utilized EAF dust samples with the following components, as determined by an elemental analysis.

TABLE 5

| Component | Wt. Percent (%) |
|---|---|
| Iron | 22.0 |
| Zinc | 23.7 |
| Lead | 2.1 |
| Cadmium | 0.073 |
| Manganese | 2.87 |
| Chrome | 0.20 |

A quantity of EAF dust (310 g wet weight/249 g dry weight) was pulped using 30 minutes of mixing with 748 g of 44.2 weight percent nitric acid to give a slurry weight of 997 g with 25 weight percent solids. This initial mixing was performed prior to heating. These test were also performed in a pressurized reactor at a temperature of 220 degrees C. for 120 minutes. The maximum pressure for these experiments was 620 psig with no bleed.

As shown in Table 6, this test again demonstrates the ability of the pressurized leach process to obtain ferric oxide purities below the EPA limits such that the materials are no longer hazardous waste.

TABLE 6

|  | As (mg/L) | Ba (mg/L) | Cr (mg/L) | Hg (mg/L) | Ni (mg/L) | Pb (mg/L) |
|---|---|---|---|---|---|---|
| EPA limit (delisting) | 0.5 | 7.6 | 0.33 | 0.001 | 1.0 | 0.15 |
| 2868-12 | <0.03 | 1.6 | 0.01 | <0.0001 | 0.006 | <0.073 |

Example 3

Secondary Leach Of Test Residue

Products from a first pressurized leach were subjected to a second pressurized leach to demonstrate further reductions in the contaminant levels. One of these test was performed with products from Example 1 and a second test was performed with products from Example 2.

A 35 g dry weight sample of filter cake residue produced from a single leach process (residue is from PAL6 of Example 1), was repulped with 706 g of de-ionized water and 40 g of 69 weight percent fresh nitric acid solution and releached. The nitric acid was added to the residue prior to the introduction of the mixture to the reactor. The leach slurry was approximately 4 weight % solids. A stirred Parr pressure reactor was utilized with a steam pressure of about 317 psig. The "second stage" pressure leach tests were performed in a manner similar to the first stage leach tests. Generally, the second leaching step was able to further reduce the impurity levels in the iron residue product of a single-stage leach. Table 7 provides the results from the secondary leach.

TABLE 7

| Test | Deg C. | Free Acid (g/L) | Fe (%) | Zn (%) | Pb (%) | Cd (%) | Mn (%) | Cr (%) |
|---|---|---|---|---|---|---|---|---|
| 1st leach (PAL6) | 220 | 91 | 54 | 0.11 | 0.021 | 0.001 | 0.088 | 0.44 |
| 2nd leach (PAL6B) | 220 | 37 | 59 | 0.03 | <0.02 | <0.0005 | 0.067 | 0.53 |

A second two stage leach test was also performed based on the product from the pressurized leach process as described in Example 2 with the amount of nitric acid as described below. Initial residue was prepared by adding 300 g of water washed dust filter cake (240 g solids dry weight) to 720 g of 27% nitric acid. The slurry was allowed to mix for 20 minutes before being added to a Parr pressure reactor. The reactor temperature was then raised to 220 degrees C. and held for 3 hours at temperature. The pressure leach stage resulted in a low final residual free nitric acid level of 15 g/L which resulted in incomplete dust dissolution. In the second pressurized leach test, 80 g of dry residue from this first test was combined with 320 g of 20% nitric acid and reacted in an autoclave for 1.5 hours at 220 deg C. (2868-8). The final residue had low residual impurity levels, as presented in Table 8.

TABLE 8

| Test | Deg C. | Free Acid (g/L) | Fe (%) | Zn (%) | Pb (%) | Cd (%) | Mn (%) | Cr (%) |
|---|---|---|---|---|---|---|---|---|
| 1st leach | 220 | 15 | 42 | 9.9 | 0.102 | 0.009 | 3.7 | 0.36 |
| 2nd leach | 220 | 82 | 56 | 0.10 | 0.008 | N/A | 0.08 | N/a |

The second leach is able to significantly increase the purity of the ferric oxide with respect to non-ferrous metals except for chromium. This is true even if the first leach was performed under conditions of lower free acid levels (incomplete dissolution).

Example 4

Preleach Tests

This experiment demonstrates that the performance of a first leach step at atmospheric pressures can effectively reduce impurity levels prior to performance of further processing.

The pH of the slurry can be controlled to adjust the purity of the product from this atmospheric leach. The test were performed with a slurry with about 30 weight % solids. A 240 g quantity of solids was combined with 400 g water. Then, 69 weight percent nitric acid was added to obtain the desired test pH. The test conditions for four runs are presented in Table 9.

TABLE 9

Test Conditions

| Test No | pH | Pulp Density % solids | Leach Time (min) | Temp (° C.) | 69% Nitric (kg/t feed) |
|---|---|---|---|---|---|
| NL-3 | 1.5-2.0 | ~30 | 240 | 25 | 572 |
| NL-2 | 1.0-1.5 | ~30 | 240 | 25 | 664 |
| NL-4 | 0.5-1.0 | ~30 | 240 | 25 | 725 |
| NL-5 | 1.0-1.5 | ~30 | 240 | 80 | 704 |

^denotes feed added to acid solution.

The solid residue from the test was further analyzed. The results of the analysis are presented in Table 10.

TABLE 10

| Test No | Retention Time (h) | Solution Assays (mg/L) | | | | | | Residue Assays (%) | | | | | | Dissolution (%) | | | | | |
|---|---|---|---|---|---|---|---|---|---|---|---|---|---|---|---|---|---|---|---|
|  |  | Cd | Cr | Fe | Mn | Pb | Zn | Cd | Cr | Fe | Mn | Pb | Zn | Cd | Cr | Fe | Mn | Pb | Zn |
| NL-3 | 0 | 331 | 0.735 | 1.4 | 940 | 3760 | 69000 | 0.0253 | 0.34 | 35 | 4.7 | 0.806 | 19 | 81.1 | 0.1 | 0.0 | 6.2 | 60.5 | 54.4 |
|  | 1 | 330 | 1.29 | 11 | 1100 | 3910 | 71000 | 0.0235 | 0.36 | 36 | 4.8 | 0.742 | 18 | 83.9 | 0.1 | 0.0 | 7.8 | 66.2 | 59.4 |
|  | 2 | 339 | 3.5 | 37 | 1200 | 4300 | 75000 | 0.0180 | 0.38 | 37 | 5.1 | 0.496 | 17 | 88.3 | 0.4 | 0.0 | 8.7 | 77.7 | 64.0 |
|  | 3 | 357 | 0.417 | 1.5 | 1200 | 4160 | 73000 | 0.0181 | 0.37 | 37 | 4.9 | 0.637 | 16 | 87.7 | 0.0 | 0.0 | 8.1 | 70.2 | 62.2 |
|  | 4 | 332 | 0.55 | 2.9 | 1200 | 4070 | 77000 | 0.0201 | 0.40 | 40 | 5.2 | 0.637 | 18 | 85.6 | 0.1 | 0.0 | 7.7 | 69.8 | 60.7 |
| NL-2 | 0 | 320 | 12 | 310 | 1100 | 4400 | 72000 | 0.0200 | 0.38 | 38 | 4.9 | 0.61 | 16 | 86.0 | 1.2 | 0.3 | 8.0 | 73.5 | 63.4 |
|  | 1 | 330 | 15 | 420 | 1300 | 4900 | 79000 | 0.0150 | 0.40 | 40 | 5.1 | 0.48 | 15 | 90.7 | 1.6 | 0.5 | 10.1 | 81.8 | 69.9 |
|  | 2 | 310 | 28 | 1100 | 1300 | 4300 | 66000 | 0.0130 | 0.38 | 39 | 5.2 | 0.30 | 15 | 91.6 | 3.3 | 1.3 | 10.3 | 86.8 | 66.9 |

TABLE 10-continued

| Test No | Retention Time (h) | Solution Assays (mg/L) | | | | | | Residue Assays (%) | | | | | | Dissolution (%) | | | | | |
|---|---|---|---|---|---|---|---|---|---|---|---|---|---|---|---|---|---|---|---|
| | | Cd | Cr | Fe | Mn | Pb | Zn | Cd | Cr | Fe | Mn | Pb | Zn | Cd | Cr | Fe | Mn | Pb | Zn |
| | 3 | 310 | 32 | 1000 | 1300 | 4800 | 75000 | 0.0140 | 0.39 | 40 | 5.5 | 0.28 | 15 | 92.5 | 4.4 | 1.4 | 11.7 | 90.6 | 73.7 |
| | 4 | 330 | 22 | 460 | 1400 | 4700 | 76000 | 0.0160 | 0.42 | 41 | 5.1 | 0.40 | 15 | 91.5 | 2.7 | 0.6 | 12.6 | 86.0 | 72.7 |
| NL-4 | 0 | 320 | 39 | 1500 | 1300 | 4800 | 74000 | 0.0199 | 0.39 | 39 | 5.1 | 0.43 | 16 | 86.3 | 3.7 | 1.5 | 9.1 | 81.5 | 64.4 |
| | 1 | 290 | 61 | 3700 | 1300 | 4800 | 72000 | 0.0144 | 0.40 | 40 | 5.5 | 0.29 | 16 | 90.7 | 7.0 | 4.3 | 10.3 | 88.8 | 68.6 |
| | 2 | 340 | 81 | 4500 | 1600 | 5200 | 81000 | 0.0132 | 0.39 | 41 | 5.5 | 0.23 | 15 | 92.5 | 9.1 | 5.0 | 12.2 | 91.7 | 72.1 |
| | 3 | 330 | 120 | 6400 | 1700 | 5300 | 82000 | 0.0130 | 0.39 | 41 | 5.5 | 0.20 | 15 | 92.5 | 12.9 | 7.1 | 13.1 | 92.7 | 72.7 |
| | 4 | 320 | 130 | 6900 | 1800 | 4900 | 78000 | 0.0128 | 0.34 | 43 | 5.9 | 0.18 | 16 | 92.2 | 15.3 | 7.1 | 12.6 | 93.0 | 69.8 |
| NL-5 | 0 | 277 | 2.19 | 21 | 1100 | 3680 | 58000 | 0.0160 | 0.38 | 35 | 4.9 | 0.43 | 15 | 89.9 | 0.3 | 0.0 | 10.3 | 81.5 | 66.5 |
| | 1 | 304 | 1.23 | 33 | 1300 | 3770 | 63000 | 0.0140 | 0.38 | 36 | 5.0 | 0.44 | 15 | 90.8 | 0.1 | 0.0 | 10.5 | 79.5 | 65.5 |
| | 2 | 301 | 116 | 620 | 2000 | 5000 | 74000 | 0.0140 | 0.40 | 38 | 5.2 | 0.12 | 13 | 92.2 | 13.8 | 8.3 | 17.5 | 95.8 | 75.9 |
| | 3 | 324 | 14.1 | 230 | 1800 | 4930 | 78000 | 0.0130 | 0.42 | 37 | 4.8 | 0.25 | 13 | 92.0 | 1.5 | 0.3 | 14.8 | 90.1 | 73.5 |
| | 4 | 344 | 29.2 | 200 | 2200 | 5430 | 86000 | 0.0110 | 0.40 | 38 | 4.7 | 0.17 | 12 | 92.9 | 2.9 | 0.2 | 16.3 | 93.0 | 74.9 |

These results show that the pH can be adjusted to dissolve significant quantities of the non-ferrous metals while leaving most of the iron in the solids. Thus, a more purified solid can be used in the resulting pressurized leach.

Example 5

XRF (Crystalinity) Data

This example presents x-ray data showing that the recovered $Fe_2O_3$ is in crystalline hematite form.

Figure 4:
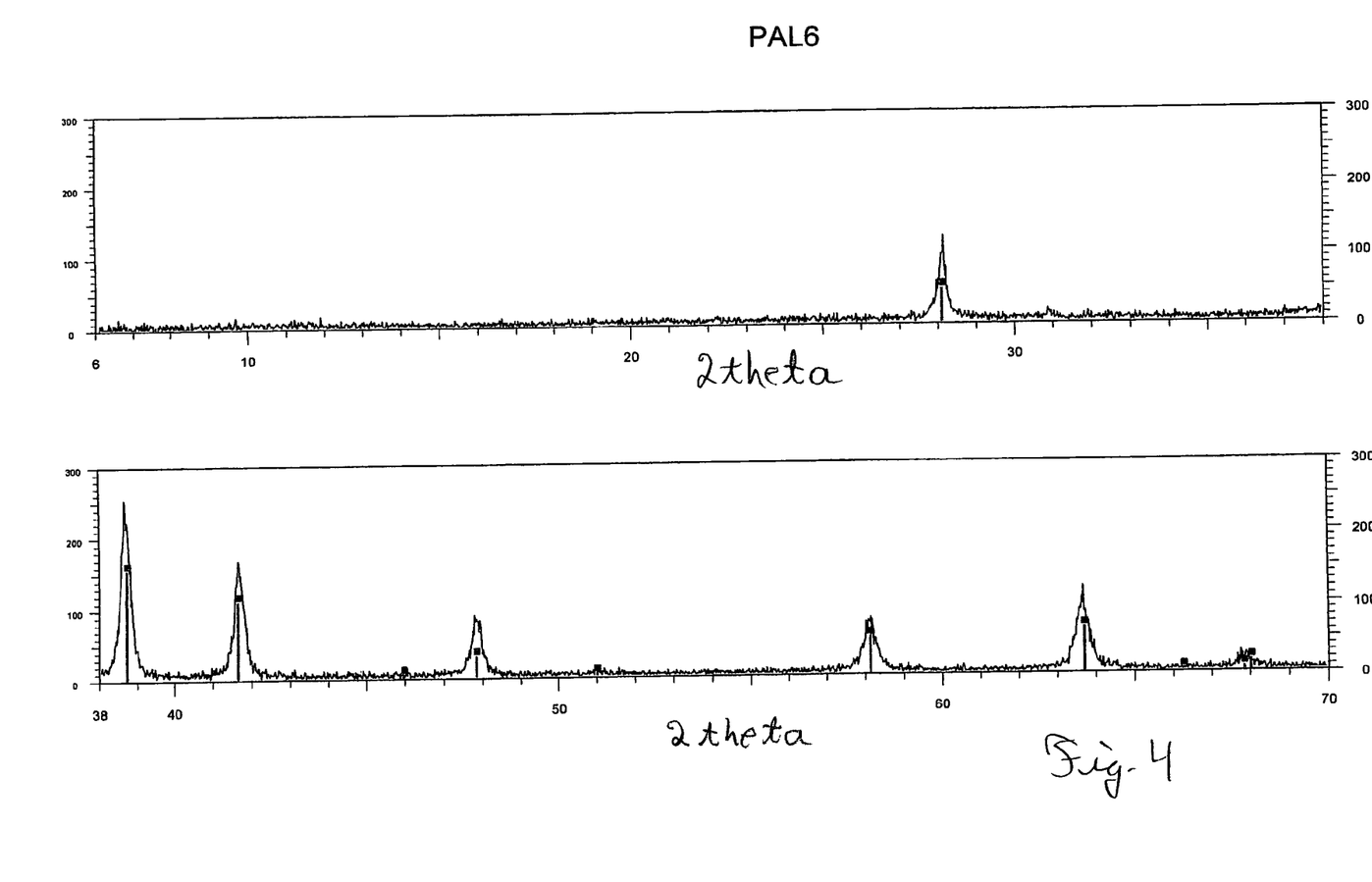
FIG. 4 is an x-ray diffractogram for one sample following a pressurized leach treatment.
Figure 5:
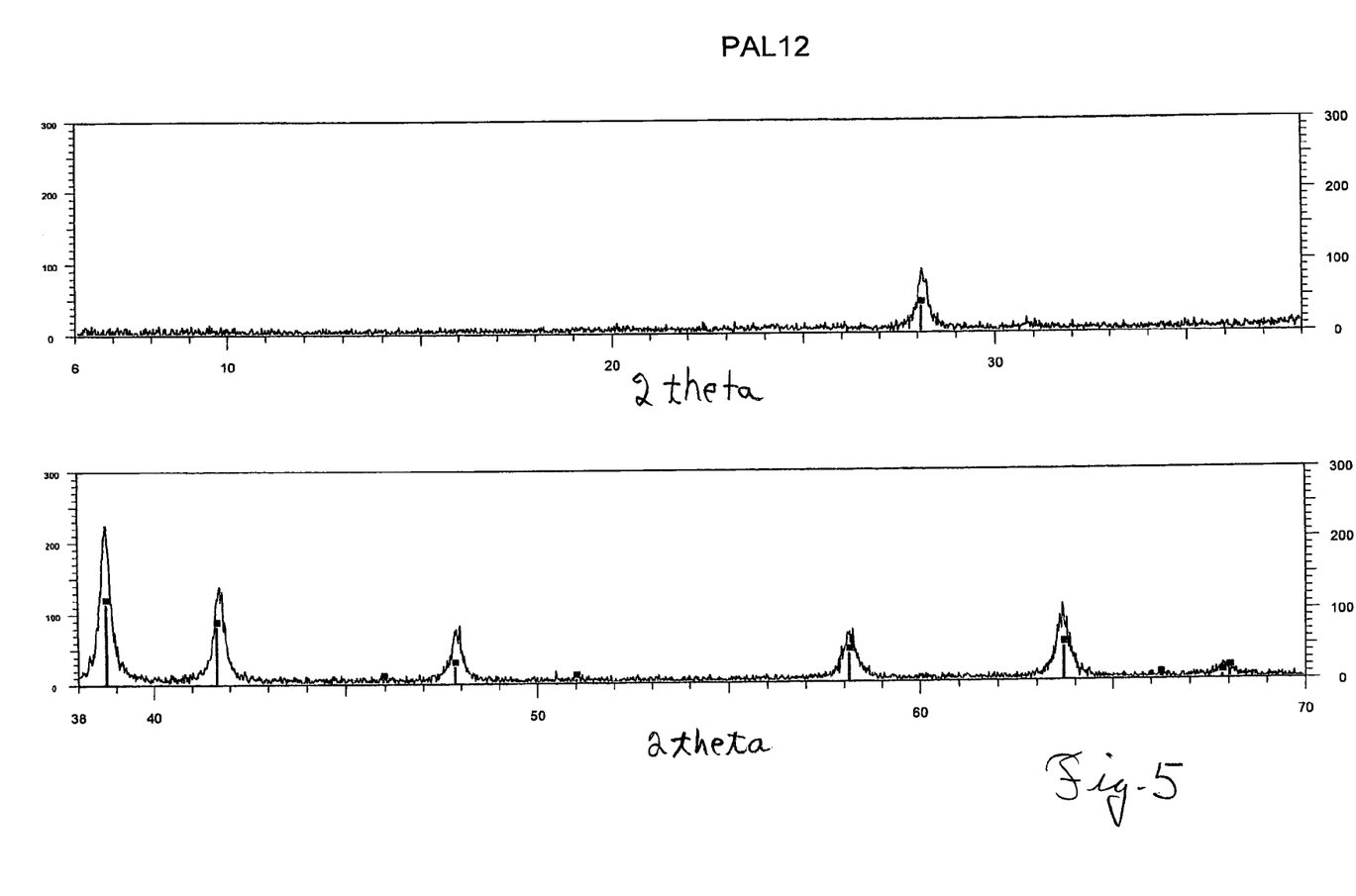
FIG. 5 is an x-ray diffractogram of another sample following a pressurized leach treatment.

Referring to FIGS. 4 and 5, the x-ray diffraction data is shown for Samples Pal 6 and PAL-12, another sample produced by a similar leach as the examples above. The x-ray diffraction data was obtained on a Siemens D5000 diffractometer using Co radiation. The major crystalline components from these diffractograms is hematite $Fe_2O_3$.

As understood by those skilled in the art, additional embodiments may be practiced within the scope and intent of the present disclosure of the invention. The embodiments above are intended to be illustrative and not limiting. Additional embodiments are within the claims. Although the present invention has been described with reference to particular embodiments, workers skilled in the art will recognize that changes may be made in form and detail without departing from the spirit and scope of the invention.

What is claimed is:

1. A method of treating metallurgical dust, the method comprising:
   (a) washing the metallurgical dust with water to remove halides, the metallurgical dust comprising halides, iron and one or more non-ferrous metals;
   (b) leaching the metallurgical dust with nitric acid solution at ambient pressure and separating the leached metallurgical dust; and
   (c) reacting at a pressure of at least about 50 psig and at a corresponding temperature of at least about 100° C. the leached metallurgical dust with another quantity of nitric acid solution to dissolve at least a portion of the non-ferrous metal compositions into the solution which is in contact with solid ferric oxide wherein the metallurgical dust is an iron bearing hazardous waste, and wherein the solid ferric oxide is a non-hazardous waste comprising at most about 0.5 mg/L As, 7.6 mg/L Ba, 0.33 mg/L Cr, 0.001 mg/L Hg, 1.0 mg/L Ni, and 0.15 mg/L Pb.

2. The method of claim 1 wherein the temperature ranges from 100° C. to 300° C.

3. The method of claim 1 wherein the temperature ranges from 150° C. to 240° C.

4. The method of claim 1 wherein the pressure ranges from 250 psig to 800 psig.

5. The method of claim 1 wherein the pressure ranges from 275 psig to 600 psig.

6. The method of claim 1 wherein the nitric acid solution has an initial concentration ranging from 15 weight percent to 45 weight percent.

7. The method of claim 1 wherein the nitric acid solution has an initial concentration ranging from 20 weight percent to 30 weight percent.

8. The method of claim 1 wherein the solution following the dissolving of the soluble non-ferrous metal compositions has free nitric acid remaining.

9. The method of claim 1 wherein the free nitric acid is further reacted with another quantity of metallurgical dust.

10. The method of claim 1 wherein the nitric acid solution has a pH ranging from about 0.25 to about 2.5.

11. The method of claim 1 wherein the metallurgical dust comprises Electric Arc Furnace (EAF) dust.

12. The method of claim 1 wherein the metallurgical dust comprises Basic Oxygen Furnace (BOF) dust.

13. The method of claim 1 further comprising separating the solid ferric oxide from the solution.

14. The method of claim 13 further comprising reacting the separated ferric oxide with another nitric acid solution at greater than atmospheric pressure and under heat treatment.

15. The method of claim 1 wherein the solid ferric oxide is crystalline.

16. The method of claim 13 further comprising combining the separated solid ferric oxide with a suitable carrier liquid to form a coating composition.

17. The method of claim 13 further comprising blending the separated solid ferric oxide with a molding composition that sets into a solid pigmented article.

18. The method of claim 17 wherein the molding composition comprises a polymer or concrete.

19. The method of claim 1 wherein the metallurgical dust and water form a mixture which is stirred.

20. The method of claim 19 wherein after step (a) the mixture is subjected to a solid-liquid separation method to substantially remove halides and to produce a filtrate and a precipitate.

21. The method of claim 20 wherein the solid-liquid separation method is selected from the group consisting of at least one of settling/sedimentation, pressure filtration, vacuum filtration, gravity filtration, and centrifugation.

22. The method of claim 21 wherein any of the filtration methods involves the use of a filter media.

23. The method of claim 22 wherein the filter media is selected from the group consisting of at least one of polymer woven cloth filter media, paper filter media, and porous ceramic filter media.

24. The method of claim 20 wherein the precipitate is used in step (b).

25. The method of claim 20 further comprising processing the filtrate using a water treatment system.

* * * * *